United States Patent Office 3,142,670
Patented July 28, 1964

3,142,670
VACUUM DRUM DRYING OF STREPTOMYCIN SULFATE
Clarence C. Christman, Springfield, Pa., Rudolph Cicchetti, Harrisonburg, Va., and William John Timson, Arlington, Mass., assignors to Merck & Co., Inc., Rahway, N.J., a corporation of New Jersey
No Drawing. Filed Apr. 6, 1962, Ser. No. 185,504
3 Claims. (Cl. 260—210)

The present invention is concerned with improvements relating to the production of streptomycin salts suitable for parenteral administration. More particularly, it relates to the drying of sterile streptomycin sulfate under sub-atmospheric pressures and to the novel product produced by this procedure.

Streptomycin is a known antibiotic and has been produced as the sulfate salt by a variety of methods for more than a decade. Its large-scale production by submerged aerobic fermentation and its isolation and purification by a variety of methods including adsorption on and elution from charcoal, ion-exchange techniques and precipitation by organic solvents have been described in numerous publications and patents. Methods have also been described for the conversion of the antibiotic to various salts such as the sulfate and for the isolation and drying of such salts in a manner suitable for use in parenteral administration to humans. Of the methods employed for isolating and drying streptomycin salts only freeze-drying of an aqueous solution or precipitation from solvent solutions followed by drying of the precipitated solid have been found to be useful for the preparation of parenteral dosage forms. Both of these methods, however, have serious limitations with respect to quality control and cost in large-scale operations.

Streptomycin sulfate, offered for sale, is often packaged in individual or multidose vials in dry form prepared for reconstitution by the addition of a measured amount of distilled water at the time of administration to the individual patient. It is important, therefore, that the sreptomycin sulfate contained in such vials be readily dissolved in sterile water, be free from undesirable colored impurities and be of satisfactory and uniform potency. In multidose vials it is also important that the aqueous solutions prepared maintain their potency and freedom from undesirable color for periods of 48 hours or longer.

One of the principal drawbacks of the streptomycin sulfate produced by prior art processes is a comparatively slow solution rate. As a consequence, preparation and administration of parenteral solutions of such products is attended by certain inherent disadvantages and dangers. In the first place the attending physician wastes considerable time in preparing proper solutions from such products and in the second place the possibility exists that the patient may be administered less than a therapeutic dose if less than the total amount of medication dissolves in the solution to be administered. It has now been discovered that sterile aqueous solutions of streptomycin sulfate free of organic solvents can be drum-dried under partial vacuum to produce a product which is entirely satisfactory for use in parenteral forms for administration to humans.

An extremely important property of the streptomycin sulfate produced by this process is its rapid rate of solution in water. Thus it has been found that portions of dried streptomycin sulfate corresponding to individual dosage forms can be dissolved in the requisite amount of water in as little as 10 seconds. This compares with samples prepared by certain of the prior art processes which required up to four minutes or nearly 25 times as long to dissolve under identical conditions. Streptomycin sulfate prepared by applicants' novel process is also greatly improved with respect to color stability and possesses a high uniform potency.

The present invention comprises the removal of water from sterile aqueous solutions of streptomycin sulfate substantially free of organic solvents by applying a thin film of such a sterile solution to the surface of a heated rotating drum maintained at a sub-atmospheric pressure, maintaining the film in contact with the drum for a period of time sufficient to allow evaporation of water, and subsequently removing the dried streptomycin sulfate from the heated surface.

One convenient method of carrying out the process of the invention is by use of a sterilized double drum type vacuum drum drier. The sterile aqueous solution of streptomycin sulfate is drawn into the vacuum drum drier and fed into the V-shaped space between the parallel-mounted drums in order to form a thin film of solution on the surface of the rotating drums. The thickness of the film of aqueous streptomycin sulfate solution is conveniently controlled by proper adjustment of the clearance between the surfaces of the two drums. The film of aqueous solution is maintained in contact with the surface of the drum for a limited period of time by controlling the speed of rotation of the drum. The dried streptomycin sulfate is removed from the surface of the drum by a knife blade which is pressing against the surface of the drum.

In carrying out the process of our invention it is important to the successful preparation of dried streptomycin sulfate that the starting aqueous solution be substantially free of organic solvents, contain from approximately 20 to about 70% dissolved solids by weight, said solids having a purity of about at least 650 mcg. of streptomycin base per milligram of dissolved solids. It is also important that this solution be sterile and free from any substantial amounts of undesirable colored impurities.

Also of critical importance to the successful performance of the process of the present invention is careful control of the drying operation itself. Thus, it is essential that the aqueous streptomycin sulfate solution be distributed on the drying surface in a very thin film but for a relatively short period of time, and that the dried solids be promptly removed from the heated surface to avoid extensive decomposition. These conditions are easily accomplished by employing a double drum vacuum drier of the type described above. The thickness of the film of solution is controlled by maintaining the distance between the drums between about .004 in. and .03 in. The temperature of the drums is maintained between about 80° C. to about 150° C. and the speed rotation of the drums is controlled so that the film of sterile solution is in contact with the surface of the heated drums for a period ranging from about 4 to about 40 seconds.

In accordance with one embodiment of our invention, a solution of streptomycin sulfate, which is described as a "rich cut" in U.S. Patent 2,804,456, is decolorized by the addition of about 1% by weight of activated charcoal and agitation of the solution for a short period of time. Following agitation the solution is filtered to remove the charcoal with absorbed colored impurities. The filtrate containing the dissolved streptomycin sulfate is then treated with methanol to precipitate the calcium sulfate dissolved therein and filtered to remove the precipitated calcium sulfate. The resulting aqueous methanol filtrate containing dissolved streptomycin sulfate is then sterilized by filtration through a microbiological filter and the filtrate concentrated under reduced pressure and under sterile conditions until the concentration of solids is approximately 40% on a weight basis and the alcohol content reduced below about 5%. The sterile aqueous solution of streptomycin sulfate thus produced is then fed into the top of a pre-sterilized vacuum drum drier of the double drum type maintained at a pressure of less than about 50 mm. mercury. The temperature of the surface of the drums is maintained below about 150° C. and the drums are rotated at such a speed that the streptomycin sulfate is in contact with the surface of the heated drum for a period of less than about 40 seconds. The dried streptomycin sulfate is scraped from the surface of the drum into a receiver which is also maintained under a partial pressure.

The vacuum drum drier used may be any of a number of commercial types provided with fittings so that the vacuum chamber surrounding the drums may be sterilized by steam or other means prior to carrying out the drying operation and adapted in such a way that it may be maintained in a sterile condition during the drying operation. In addition the materials of construction which contact the streptomycin sulfate solution or the dried product are selected so that a minimum amount of metal contamination and/or other impurities will be introduced into the final product. The preferred drier is a vacuum type double drum drier of the top feed type. A drier of this type contains two parallel mounted drums equipped with fittings so that they may be heated with steam. The inlet for solution to be dried is positioned so that the feed solution will drop directly into the V-shaped spaced between the parallel mounted drums which rotate toward each other in the direction of flow of solution. It is equipped with variable speed drive, stainless steel knives, cast iron chrome plated drums, and inlet feed spray shield. The interior of the vacuum chamber should be stainless steel throughout for corrosion protection and ease of cleaning. Feed inlet lines and spray shield are preferably of stainless steel construction. End boards are made of suitable plastics or stainless steel. The end board pressure is controlled by take-up screws pressing against the sides of the end boards. Prior to sterilization of the drier the drums are positioned so that the distance between them is maintained between about .004 in. and .03 in.

Vacuum for the drum drier is provided by any convenient means. One such method is to use a multistage steam jet to provide vacuum for the drier chamber. The water vapor removed from the aqueous streptomycin sulfate solution is removed by means of a water cooled condenser connected to a receiver maintained under vacuum condensate collection. The drum drier chamber is preferably jacketed and the chamber walls heated conveniently with steam to prevent condensation on the inner walls. The drums are internally heated by connection to a high pressure steam source through a control valve. The steam condensate outlet from the drums is provided with multiple outlets and valving arrangements. A steam trap is provided for pressurizing the drums, an open vent for free atmospheric steam and a connection to the vacuum line to provide vacuum steam for temperature below 100° C. in the drums. Dial thermometers are provided on the inlet and outlet of the drums as well as a pressure gauge on the inlet. Feed to the drum drier is drawn in under the vacuum from a reservoir of sterile aqueous streptomycin sulfate solution. Knife pressure may be adjusted by provision of a wing nut on each end of the knife. The dried product is scraped off the drums by the knives and collected in stainless steel collecting pans resting on the bottom of the vacuum enclosure.

The aqueous streptomycin sulfate solution used as the starting material in carrying out our novel process may be prepared by any of the methods known in the art to produce solutions having a purity of about 650 mcg. of streptomycin base per mg. of dissolved non-volatile solids. It is important to note that, in preparing such solutions, care must be exercised to free them of any substantial amounts of organic solvents which may be present. One method of preparation which has been found to be satisfactory is described in U.S. Patent 2,804,456, Streptomycin Sulfate Resin Metathesis of Pierson et al. The solutions identified as "rich cuts" in the specification and examples of the patent, when properly processed, are satisfactory starting materials for use in the process of the present invention.

The "rich cut" described by this procedure contains residual calcium sulfate dissolved in the aqueous streptomycin sulfate solution. This residual calcium sulfate is conveniently precipitated from the aqueous streptomycin sulfate solution by the addition of methanol or ethanol. After precipitation of the calcium sulfate the solution is filtered to remove the precipitated calcium sulfate and the filtrate containing dissolved streptomycin sulfate and substantially free of calcium sulfate is concentrated in a circulating evaporator under partial vacuum to remove the alcohol introduced in the precipitation step. It is essential to the successful operation of the vacuum drum drying process that the solution to be dried be substantially free from contamination with organic solvents. It is therefore important that the alcohol content of the solution be reduced to less than about 5% during the course of this concentration step. The concentration is carried out while maintaining the internal temperature of the aqueous streptomycin solution below 35° C. Evaporation is continued until the concentration of the aqueous streptomycin sulfate is approximately 40%–70% dissolved solids on a weight basis.

It will be apparent from the preceding description that the order of steps used in preparing aqueous solutions of streptomycin sulfate to be fed to the vacuum drum drier is not critical. Thus, the above-identified "rich cuts" may be first carbon treated then decalcified, sterilized and concentrated, or may be first decalcified, concentrated, decolorized and sterilized. The important consideration in preparing the starting material is that the solution to be dried be substantially free from organic solvents and undesirable colored impurities and contain streptomycin sulfate of such purity that the dissolved non-volatile solids have a minimum streptomycin assay of at least 650 mcg. of streptomycin base per mg. of dissolved non-volatile solids.

In accordance with one method of preparation of the starting material an aqueous solution of streptomycin sulfate substantially free of organic solvents is first adjusted to a concentration of from about 20 to about 70% solids on a weight basis. For optimum results a solution having approximately 40% solids is employed; lower concentrations result in less economical use of the drier and higher concentrations are more difficult to handle because of less desirable viscosity characteristics. Dilute solutions may, if desired, be concentrated under vacuum to produce a solution of desired concentration. The aqueous solution of desired concentration is then agitated with a small quantity of activated charcoal to remove objectionable impurities and filtered to remove the charcoal with absorbed impurities. The filtered solution containing the dissolved streptomycin sulfate is then sterilized preferably by filtering through a bacterial filter to remove bacterial contamination.

Selection of the bacterial filter is largely dependent on the concentration of the streptomycin sulfate solution. For solutions having a solid concentration of 40% or less, the preferred bacterial filter is a filter candle having a maximum pore diameter of about 1.2 microns. Filtration of solutions having concentrations of more than about 40% solids are preferably carried out using bacteriological filter pads. The filtrate thus obtained is a sterile aqueous solution of streptomycin sulfate, substantially free of contamination with organic solvents, suitable for feeding directly to a sterilized vacuum drum drier.

Solid streptomycin sulfate produced in this manner is a unique product which has a very rapid rate of solution. Solutions of this material maintain their low level of color and uniform biological potency for substantial periods of time.

In the illustrative examples which follow, operating temperatures are given in degrees centigrade, clearance between drums is measured in inches, pressure within the drier is measured in mm. of mercury, and the concentration of solids in solution is calculated on a weight basis. The time that the streptomycin sulfate solution is in contact with the heated surface of the drum may easily be calculated from the speed of rotation of the drum which is given in revolutions per minute. The solution is in contact with the surface of the drum for approximately two-thirds of a complete revolution. Thus, 1 r.p.m. would correspond to approximately a 40 second period that the streptomycin sulfate is maintained in contact with the surface of the heated drum.

*Example 1*

An aqueous streptomycin solution prepared as described in the resin metathesis procedure of U.S. Patent 2,804,456 and identified therein as "rich cut" is treated with sufficient ethanol to precipitate the dissolved calcium sulfate. After precipitation of the calcium sulfate the solution is filtered to remove the precipitated calcium sulfate and the filtrate containing dissolved streptomycin sulfate substantially free of calcium sulfate is concentrated in a circulating evaporator under partial vacuum to remove the alcohol introduced during the precipitation step.

It is essential to the successful operation of the vacuum drum drying process that the alcohol content be reduced to less than about 5% during the course of this concentration step. The concentration is carried out while maintaining the internal temperature of the aqueous streptomycin solution below 35° C. Evaporation is continued until the concentration of the aqueous streptomycin sulfate solution is approximately 70% dissolved solids on a weight basis.

One portion of the concentrated aqueous streptomycin sulfate solution is agitated with about 1% activated charcoal to remove undesirable colored impurities and then filtered to remove the carbon with adsorbed impurities. The filtrate containing the purified streptomycin sulfate is then filtered through a bacteriological filter pad. The resulting filtrate is a sterile aqueous solution of streptomycin sulfate ready for feeding to the vacuum drum drier.

A double-drum drier having drums of 6 in. in diameter and 8 in. in length is provided with fittings to its jacket so that the interior of the drier may be sterilized with steam prior to use. After sterilization of the drier with steam the aqueous solution of streptomycin sulfate having a concentration of about 70% dissolved solids is drawn into the drier by vacuum. The drier is operated under a vacuum of 20 mm. pressure. The drum speed is adjusted to 2.67 r.p.m. so that the film of sterile aqueous streptomycin sulfate solution is maintained in contact with the heated drum for a period of about 15 seconds. The drum temperature is maintained by proper adjustment of steam pressure at a temperature of about 80° C. and the clearance between the surface of the drum is adjusted to about 0.005 in. The feed rate of the feed solution being drawn into the drier is regulated so that a small reservoir of aqueous streptomycin sulfate solution is maintained above the point of contact of the two drums. The dried streptomycin sulfate solution is scraped from the surface of the drum with a stainless steel blade into a receiver.

The dried streptomycin sulfate prepared in this manner is a satisfactory material for parenteral administration having a chemical assay of greater than 650 mcg./mg. satisfactory color stability and a very rapid solution rate.

*Example 2*

A portion of the sterile aqueous streptomycin sulfate solution prepared in accordance with the procedures described in Example 1 is diluted with sufficient sterile distilled water so that the concentration of the resulting streptomycin sulfate solution is about 21% on a weight basis. The drying procedure of Example 1 is repeated using the 21% solution as feed for the drier. The dried streptomycin sulfate product obtained is satisfactory for parenteral administration from the standpoint of assay, color stability and rate of solution in water.

*Example 3*

An aqueous solution of streptomycin sulfate is prepared according to the procedures of Example 1 and diluted with sterile distilled water to a feed concentration of approximately 40% dissolved solids on a weight basis and fed to a vacuum drum drier of the type described in Example 1 under the following conditions:

Drum surface temperature—100° C.
Drum speed—1.6 r.p.m. (25 second contact time).
Drum clearance—0.007 in.
Vacuum—18 mm. mercury.
Solution feed rate—30 cc. per minute.

The dried streptomycin sulfate obtained by this procedure is entirely satisfactory for parenteral administration having a streptomycin assay of greater than 650 mcg./mg. good color stability and a rapid rate of solution in water.

*Example 4*

Aqueous solutions of streptomycin sulfate of varying concentrations are prepared by dilution with sterile distilled water of a 70% solution prepared as described in Example 1 hereinabove. A series of drying experiments are then performed using a vacuum drum drier of the type described in Example 1. The conditions under which these drying experiments are carried out are listed in the following table.

| Run No. | Drum Speed, r.p.m. | Drum Clear., Ins. | Feed Conc., Wt. Percent Dried Solids | Feed Rate, cc./min. | Drum Temp., ° C. | Oper. Vac. in mm. Mercury |
|---|---|---|---|---|---|---|
| 1 | 0.76 | 0.007 | 59.5 | 13.6 | 101 | 55 |
| 2 | 1.6 | 0.007 | 59.5 | 21 | 122 | 48 |
| 3 | 1.1 | 0.007 | 59.5 | 15.9 | 79 | 16 |
| 4 | 1.1 | 0.009 | 59.5 | 14.7 | 81 | 16 |
| 5 | 1.1 | 0.012 | 59.5 | 18.9 | 122 | 18 |
| 6 | 1.1 | 0.007 | 52.8 | 18.7 | 100 | 18 |
| 7 | 0.76 | 0.012 | 39.6 | 24.2 | 101 | 19 |
| 8 | 1.6 | 0.007 | 40.1 | 30 | 102 | 19 |
| 9 | 1.6 | 0.007 | 21 |  | 102 | 18 |
| 10 | 6.0 | 0.005 | 40 | 37 | 84 | 15 |
| 11 | 6.0 | 0.005 | 40 | 47.5 | 101 | 23 |
| 12 | 6.0 | 0.005 | 40 | 45.5 | 129 | 24 |

Dried streptomycin sulfate produced in accordance with the above-described sets of operating conditions is entirely satisfactory for parenteral administration having a satisfactory streptomycin assay, a rapid solution rate, and good color stability in aqueous solution.

*Example 5*

The procedures of Example 1 are repeated using an aqueous streptomycin sulfate solution having a concentration of 40% solids by weight. The conditions of operation of the drum drier are as follows:

Drum speed—3 r.p.m. (approximately 13 seconds contact time).
Drum clearance—0.014 in.
Vacuum—13 mm. Hg.
Drum steam pressure—20.7 p.s.i.g.
Dried jacket temp.—80° C.

The dried streptomycin sulfate produced is satisfactory for parenteral administration on the basis of streptomycin assay, color stability and rate of solution in water.

We claim:
1. A process for the preparation of sterile solid streptomycin sulfate which comprises applying a thin film of a sterile aqueous solution of streptomycin sulfate having a concentration of between about 20% to about 70% solids on a weight basis, said solution being substantially free from contamination with organic solvents, to the surface of a heated revolving drum, said surface being maintained at a temperature of about 80° to about 150° C., and maintaining said film of sterile aqueous solution of streptomycin sulfate in contact with said heated drum for a period between about 4 to about 40 seconds at a pressure ranging from about 1 to about 50 mm. mercury pressure, thereby evaporating moisture from said film to produce sterile, solid streptomycin sulfate, and removing said sterile, solid streptomycin sulfate from the surface of said heated drum.

2. A process for the preparation of sterile solid streptomycin sulfate which comprises preparing a sterile aqueous solution of streptomycin sulfate having a concentration of about 40% solids and about 60% water, said solution being substantially free of organic solvents, applying a thin film of said sterile aqueous solution to the surface of a revolving drum the temperature of said surface being maintained at about 102° C. and the pressure of the surface of said drum being maintained at about 5 mm. of mercury for a period of about 13 seconds to evaporate moisture from said film and produce sterile solid streptomycin sulfate and removing said sterile solid streptomycin sulfate from the surface of said drum.

3. A process as claimed in claim 2 wherein the said aqueous sterile solution of streptomycin sulfate is prepared by agitating an aqueous solution of about 40% solids by weight of streptomycin sulfate with decolorizing charcoal, removing said charcoal to produce a decolorized streptomycin sulfate solution and filtering said decolorized solution through a bacterial filter to remove bacterial contamination and produce a sterile aqueous solution of streptomycin sulfate.

References Cited in the file of this patent

UNITED STATES PATENTS

| | | |
|---|---|---|
| 2,473,339 | Kirchmeyer et al. | June 14, 1949 |
| 2,695,285 | Coppock et al. | Nov. 23, 1954 |